(No Model.)
J. W. MORGAN.
NUT LOCK WASHER.
No. 307,570. Patented Nov. 4, 1884.
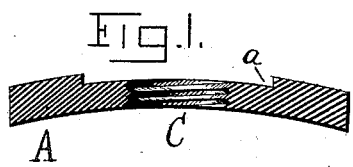
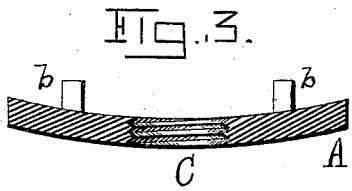
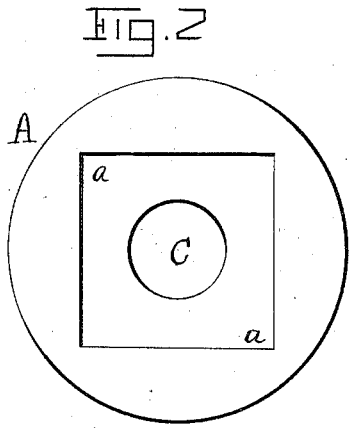
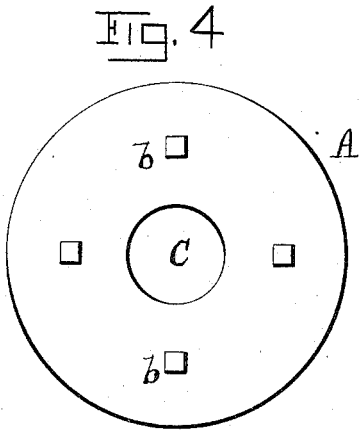
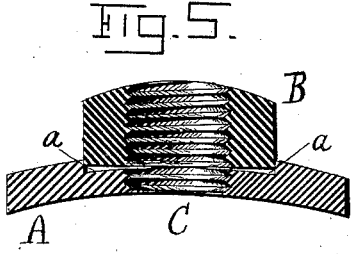
WITNESSES
N. A. Clark,
A. S. Brown.
INVENTOR
Joseph W. Morgan,
By W. E. Witherbee
Attorney.

United States Patent Office.

JOSEPH W. MORGAN, OF WILMINGTON, DELAWARE, ASSIGNOR TO THE HARE & MORGAN COMPANY, OF SAME PLACE.

NUT-LOCK WASHER.

SPECIFICATION forming part of Letters Patent No. 307,570, dated November 4, 1884.

Application filed April 21, 1884. (No model.)

*To all whom it may concern:*

Be it known that I, JOSEPH W. MORGAN, a citizen of the United States, residing at Wilmington, in the county of New Castle and State of Delaware, have invented certain new and useful Improvements in Nut-Lock Washers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention consists in certain improvements in concavo-convex nut-locking washers, which are screw-threaded, so as to be screwed onto the bolt, the following nut used in connection with this washer being screwed on so tightly as to flatten the washer. The flattening of the washer has the effect of pinching the threads of the washer against those of the bolt, and in a measure of destroying the true spiral of the thread of the washer, so that the washer is effectually prevented from turning. Hitherto, so far as I am aware, the spring of the washer has been relied upon to prevent from turning the nut which is screwed against it. This, although a more effectual locking device than the ordinary concavo-convex washer, (not screw-threaded,) really removes the difficulty but a single step, in that the effect is only to prevent both the washer and nut turning together. The nut may still be turned independently of the washer, and, as far as the nut is concerned, the screw-threaded washer possesses no advantage over the ordinary spring-washer.

The object of this invention is to provide means whereby all the advantages of the screw-threaded concavo-convex washer may be retained, and the nut shall be prevented from unscrewing independently of the washer.

In the drawings, Figure 1 is a central vertical section of a washer constructed in accordance with my invention. Fig. 2 is a top view of the same. Fig. 3 is a central vertical section of a modified form of washer. Fig. 4 is a top view of the same; and Fig. 5 is a central vertical section of a washer and nut together.

Like letters designate corresponding parts in all of the figures.

In using the concavo-convex washer A, either the concave surface, as in Fig. 1, or the convex surface, as in Fig. 3, may be the under or bearing surface.

The nut B is of ordinary construction.

As a means for preventing the nut turning independently of the washer, I have shown, in Figs. 1, 2, and 5, the washer as being provided with a recess, as at *a*, in which the nut is seated, and in Figs. 3 and 4 as being provided with projecting spuds *b b*, between which the nut is held. Any other suitable means may be adopted—as, for example, the spuds *b b* might be replaced by a projecting flange entirely surrounding the nut; or the washer might be provided with several holes, and the nut be provided with corresponding projecting spuds.

To apply the nut and washer, the nut is placed so as to be held to the washer, as in Fig. 5, and both are screwed onto the bolt, the screwing being continued until the washer is flattened out. The flattening of the washer prevents it from turning, and the nut is prevented from turning as long as the washer is securely held.

I claim as my invention—

1. As an improved article of manufacture, a concavo-convex threaded nut-locking washer formed with a recess on its face, adapted to receive a nut, whereby the nut is prevented from turning independently of the washer, substantially as set forth.

2. A concavo-convex threaded nut-locking washer formed with a recess on its face, in combination with a nut adapted to fit in said recess, substantially as and for the purpose set forth.

In testimony whereof I affix my signature in presence of two witnesses.

JOSEPH W. MORGAN.

Witnesses:
WM. W. PRITCHETT,
HARVEY B. VANDEGRIFT.